(12) United States Patent
Moriya (10) Patent No.: US 12,086,244 B2
(45) Date of Patent: Sep. 10, 2024

(54) ONBOARD INFORMATION PROCESSING DEVICE, INFORMATION PROCESSING METHOD, AND NON-TRANSITORY RECORDING MEDIUM

(71) Applicant: TOYOTA JIDOSHA KABUSHIKI KAISHA, Toyota (JP)

(72) Inventor: Tomokazu Moriya, Setagaya-ku (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 365 days.

(21) Appl. No.: 17/557,808

(22) Filed: Dec. 21, 2021

(65) Prior Publication Data

US 2022/0253523 A1    Aug. 11, 2022

(30) Foreign Application Priority Data

Feb. 5, 2021   (JP) ................. 2021-017750

(51) Int. Cl.
  *G06F 21/55*   (2013.01)
  *G06F 9/455*   (2018.01)

(52) U.S. Cl.
  CPC ........ *G06F 21/554* (2013.01); *G06F 9/45558* (2013.01); *G06F 2009/4557* (2013.01); *G06F 2009/45591* (2013.01); *G06F 2221/033* (2013.01)

(58) Field of Classification Search
  CPC ............. G06F 21/554; G06F 9/45558; G06F 2009/4557; G06F 2009/45591; G06F 2221/033; B60W 50/00; B60W 2050/0043; B60R 16/0231
  See application file for complete search history.

(56) References Cited

U.S. PATENT DOCUMENTS

| | | | |
|---|---|---|---|
| 8,051,491 B1* | 11/2011 | Cavage | H04L 63/0227 726/16 |
| 8,990,561 B2* | 3/2015 | Sheehan | G06F 21/52 713/167 |
| 9,921,860 B1* | 3/2018 | Banga | G06F 9/5077 |
| 10,419,480 B1* | 9/2019 | Tkach | H04L 63/1416 |
| 11,188,376 B1* | 11/2021 | Alexander | G06F 9/45545 |
| 11,868,213 B2* | 1/2024 | Zheng | G06F 11/1458 |
| 2010/0132015 A1* | 5/2010 | Lee | G06F 9/45558 726/3 |
| 2015/0186664 A1* | 7/2015 | Nicolaou | G06F 21/6281 726/30 |
| 2018/0225671 A1* | 8/2018 | Brown | H04L 63/0861 |
| 2018/0316671 A1* | 11/2018 | Brown | H04L 63/0884 |
| 2020/0218798 A1* | 7/2020 | Kosaka | G06F 9/455 |
| 2021/0294707 A1* | 9/2021 | Evans | G06F 11/203 |

FOREIGN PATENT DOCUMENTS

JP    2019-8503 A    1/2019

* cited by examiner

*Primary Examiner* — Javier O Guzman
(74) *Attorney, Agent, or Firm* — Oblon, McClelland, Maier & Neustadt, L.L.P.

(57) ABSTRACT

A processor is configured to determine whether or not target data, this being data that a first application is attempting to access, is permitted data based on a correspondence relationship list, and to permit the first application to access the target data in cases in which the processor has determined the target data to be the permitted data, and not to permit the first application to access the target data in cases in which the processor has determined the target data not to be the permitted data.

7 Claims, 6 Drawing Sheets

| NON-PROPRIETAR APP | PUBLIC API |
|---|---|
| 30 – 1 | 21 – 1 |
| 30 – 2 | 21 – 2 |

FIG. 5

| PUBLIC API | ACCESS FREQUENCY |
|---|---|
| 21 – 1 | 100 ms |
| 21 – 2 | 200 ms |

ONBOARD INFORMATION PROCESSING DEVICE, INFORMATION PROCESSING METHOD, AND NON-TRANSITORY RECORDING MEDIUM

CROSS-REFERENCE TO RELATED APPLICATION

This application is based on and claims priority under 35 USC 119 from Japanese Patent Application No. 2021-017750 filed on Feb. 5, 2021, the disclosure of which is incorporated by reference herein.

BACKGROUND

Technical Field

The present disclosure relates to an onboard information processing device, an information processing method, and a non-transitory recording medium.

Related Art

Japanese Patent Application Laid-Open (JP-A) No. 2019-8503 discloses an information processing device in which a process performed by an application (program) is invalidated in cases in which the application process has been determined to be an attack, based on rules defining processes (behaviors) that constitute an attack on a CPU.

Various applications may be installed in an onboard information processing device. For example, an application developed by a third party, namely a different organization to a vehicle maker that manufactured a vehicle in which the onboard information processing device is provided, may be installed in the onboard information processing device. Such an application might attempt to access illegitimately to data recorded in the onboard information processing device. In other words, the application might have the potential to carry out an attack on the onboard information processing device.

In JP-A No. 2019-8503, the content of the rules mentioned above would have to be complex in order to determine whether or not each process performed by an application constitutes an attack. Thus, were the technical concept of JP-A No. 2019-8503 to be applied to an onboard information processing device, the computational load on the onboard information processing device would become too large. The onboard information processing device would therefore need to be constructed with an expensive hardware configuration.

SUMMARY

In consideration of the above circumstances, an object of the present disclosure is to obtain an onboard information processing device, an information processing method, and a non-transitory recording medium that are able to monitor, based on simple rules, data-access activity by applications.

An onboard information processing device according to a first aspect of the present disclosure includes a processor configured to read and execute a hypervisor, a first operating system and a second operating system that operate independently of each other on the hypervisor, and at least one of first applications that operate on the first operating system. The onboard information processing device further includes a first recording section at which a plurality of types of data are recorded. The plurality of types of data is accessible by the first applications via the hypervisor and the second operating system. The onboard information processing device further includes a second recording section at which a correspondence relationship list is recorded. The correspondence relationship list specifies correspondence relationships between each of the first applications and permitted data, the permitted data being data the respective first applications have been permitted to access. The processor is configured to determine based on the correspondence relationship list, whether or not target data, which is data that the at least one first application is attempting to access, is the permitted data, and the processor is also configured to permit the at least one first application to access the target data in cases in which the target data is determined to be the permitted data, and is configured not to permit the at least one first application to access the target data in cases in which the target data is determined not to be the permitted data.

The onboard information processing device according to the first aspect of the present disclosure includes the first recording section at which a plurality of types of data are recorded, the plurality of types of data being accessible by the first applications via the hypervisor and the second operating system. The onboard information processing device further includes the second recording section at which a correspondence relationship list is recorded, the correspondence relationship list specifying correspondence relationships between each of the first applications and permitted data, the permitted data being data the respective first applications have been permitted to access. The processor makes determination, based on the correspondence relationship list as to whether or not the target data, which is data that the at least one first application is attempting to access, is the permitted data. The processor permits the at least one first application to access the target data in cases in which the processor has determined the target data to be the permitted data.

Data-access activity by the first applications is monitored based on rules expressing correspondence relationships between the respective first applications and the permitted data, as specified in the correspondence relationship list. These rules specifying the correspondence relationships between the respective first applications and the permitted data are simpler than rules that define all processes (behaviors) of each of the first applications. The onboard information processing device according to the first aspect of the present disclosure is thus able to monitor, based on simple rules, data-access activity by the first applications. Thus, the computational load on the onboard information processing device does not become too large. There is accordingly no need to construct the onboard information processing device using an expensive hardware configuration.

In an onboard information processing device according to a second aspect of the present disclosure, a first middleware that operates on the first operating system implements at least one application programmable interface (API), each of the first applications operates on the first middleware, and the correspondence relationship list specifies correspondence relationships between each of the first applications and a permitted API configuring the API that the respective first application is permitted to access to enable the respective first application to acquire the permitted data. In cases in which the processor has determined by executing the first middleware that the first applications has accessed a target API configuring at least one of the APIs, the processor determines whether or not the target API is the permitted API based on the correspondence relationship list, and in cases in which the processor has determined by executing the first middleware that the first application has accessed the permitted API, the processor permits the first application to access the second operating system through the first operating system and the hypervisor.

In the onboard information processing device according to the second aspect of the present disclosure, the first middleware that operates on the first operating system implements the at least one API, and each of the first applications operates on the first middleware. The processor determines by executing the first middleware whether or not the target API is the permitted API based on the correspondence relationship list in cases in which the first applications has been determined to have accessed a target API configuring at least one of the APIs. Moreover, the processor permits the first application to access the second operating system through the first operating system and the hypervisor in cases in which the processor has determined by executing the first middleware that the first application has accessed the permitted API.

In this manner, data-access activity by the first applications is monitored based on rules expressing correspondence relationships between the respective first applications and the permitted API, as specified in the correspondence relationship list. The rules specifying the correspondence relationships between the respective first applications and the permitted APIs are simpler than rules that define all the processes of each of the first applications. The onboard information processing device according to the second aspect of the present disclosure is thus able to monitor, based on simple rules, data-access activity by the first applications.

In an onboard information processing device according to a third aspect of the present disclosure, a second middleware that operates on the second operating system implements at least one of the APIs, the processor executes the second middleware to determine based on the correspondence relationship list whether or not the target API accessed by the first application previously determined by the processor to have accessed the permitted API is the permitted API, and in cases in which the processor has determined by executing the second middleware that the target API is the permitted API, the processor permits the first application to access the permitted data.

In the onboard information processing device according to the third aspect of the present disclosure, the second middleware that operates on the second operating system implements at least one API. Moreover, the processor executes the second middleware to determine based on the correspondence relationship list whether or not the target API accessed by the first application, previously determined by the processor to have accessed the permitted API, is the permitted API. The processor then permits the first application to access the permitted data in cases in which the processor has determined, by executing the second middleware, that the target API is the permitted API.

In this manner, data-access activity by the first applications is monitored based on rules expressing correspondence relationships between the respective first applications and the permitted API, as specified in the correspondence relationship list. The rules specifying the correspondence relationships between the respective first applications and the permitted API are simpler than rules that define all the processes of each of the first applications. The onboard information processing device according to the third aspect of the present disclosure is thus able to monitor, based on simple rules, data-access activity by the first applications.

Moreover, in the onboard information processing device according to the third aspect of the present disclosure, the processor executes the second middleware to determine based on the correspondence relationship list whether or not the target API accessed by the first application, previously determined by the processor executing the first middleware to have accessed the permitted API, is the permitted API. In this manner, access to the data (first recording section) by the first applications is monitored at two stages, with the result that determination as to whether or not the target API accessed by the first application is the permitted API is performed with greater accuracy.

An onboard information processing device according to a fourth aspect of the present disclosure further includes a third recording section at which is recorded a frequency list specifying a frequency condition that is a condition relating to frequency of access to the permitted API by the first application. In a case in which the processor has determined that an access frequency to the permitted API by the first application does not satisfy the frequency condition, the processor does not permit the first application to access the permitted data.

The onboard information processing device according to the fourth aspect of the present disclosure includes the third recording section recorded with the frequency list specifying the frequency condition that is a condition relating to the frequency of access to the permitted API by the first application. Moreover, in cases in which the processor has determined that an access frequency to the permitted API by the first application does not satisfy the frequency condition, the processor does not permit the first application to access the permitted data. Rules relating to frequency conditions are simpler than rules defining all the processes of each of the first applications. The onboard information processing device according to the fourth aspect of the present disclosure is thus able to monitor, based on simple rules, data-access activity by the first applications.

In an onboard information processing device according to a fifth aspect of the present disclosure, the processor uninstalls from the onboard information processing device the first application that accessed the target API in cases in which the processor has determined by executing the second middleware that the target API is not the permitted API.

A process by the first application to access a target API that has been determined by the processor executing the second middleware not to be the permitted API is considered to be a high risk process. Namely, there is a possibility that such a first application may carry out a high risk attack on the onboard information processing device. In the onboard information processing device according to the fifth aspect of the present disclosure, the processor uninstalls from the onboard information processing device the first application that accesses the target API in cases in which the processor has determined by executing the second middleware that the target API is not the permitted API. The fifth aspect of the present disclosure is thus capable of protecting the onboard information processing device from first applications with the potential to carry out a high risk attack.

In an onboard information processing device according to a sixth aspect of the present disclosure, the data recorded at the first recording section is data acquired by at least one second application that operates on a third operating system operating on the hypervisor independently of the first operating system and the second operating system.

The onboard information processing device according to the sixth aspect of the present disclosure is able monitor, based on simple rules, activity by the first applications to access the data acquired by the at least one second application that operates on the third operating system.

In an onboard information processing device according to a seventh aspect of the present disclosure, the at least one second application is configured to acquire data relating to a physical quantity that changes in correlation with at least one of travel, steering, or braking of a vehicle installed with the onboard information processing device.

The onboard information processing device according to the seventh aspect of the present disclosure is able to monitor, based on simple rules, activity by the first applications to access the data relating to the physical quantity that changes in correlation with at least one of travel, steering, or braking of the vehicle installed with the onboard information processing device. There is accordingly a low risk of a first application with the potential to attack the onboard information processing device illegitimately acquiring this data.

In an information processing method according to an eighth aspect of the present disclosure, a processor configured to read and execute a hypervisor, a first operating system and a second operating system that operate independently of each other on the hypervisor, and at least one of first applications that operate on the first operating system is configured to determine, in a case in which one of the first applications has attempted to access a recording section, at which is recorded a plurality of types of data, via the hypervisor and the second operating system, whether or not target data, this being the data the first application is attempting to access, is permitted data based on a correspondence relationship list specifying correspondence relationships between each of the first applications and the permitted data, the target data being the data that the respective first applications have been permitted to access, and permit the first application to access the target data in cases in which the target data is determined to be the permitted data, and is configured not to permit the first application to access the target data in cases in which the target data is determined not to be the permitted data.

A non-transitory recording medium according to a ninth aspect of the present disclosure is a non-transitory recording medium storing a program executable by a computer so as to perform processing, the program including a hypervisor, a first operating system and a second operating system that operate independently of each other on the hypervisor, and at least one of first applications that operate on the first operating system and that are configured to access a plurality of types of data through the hypervisor and the second operating system. The processing includes processing to determine whether or not target data, the target data being the data one of the first applications is attempting to access, is permitted data based on a correspondence relationship list specifying correspondence relationships between each of the first applications and the permitted data, the permitted data being the data that the respective first applications are permitted to access, and processing to permit the first application to access the target data in cases in which the target data is determined to be the permitted data, and not to permit the first application to access the target data in cases in which the target data is determined not to be the permitted data.

As described above, the onboard information processing device, the information processing method, and the non-transitory recording medium according to the present disclosure exhibit the excellent advantageous effect of enabling data-access activity by applications to be monitored by following simple rules.

BRIEF DESCRIPTION OF THE DRAWINGS

Exemplary embodiments of the present invention will be described in detail based on the following figures, wherein.

DETAILED DESCRIPTION

Explanation follows regarding an exemplary embodiment of an onboard information processing device 10, an information processing method, and a non-transitory recording medium according to the present disclosure, with reference to the drawings.

Figure 1:
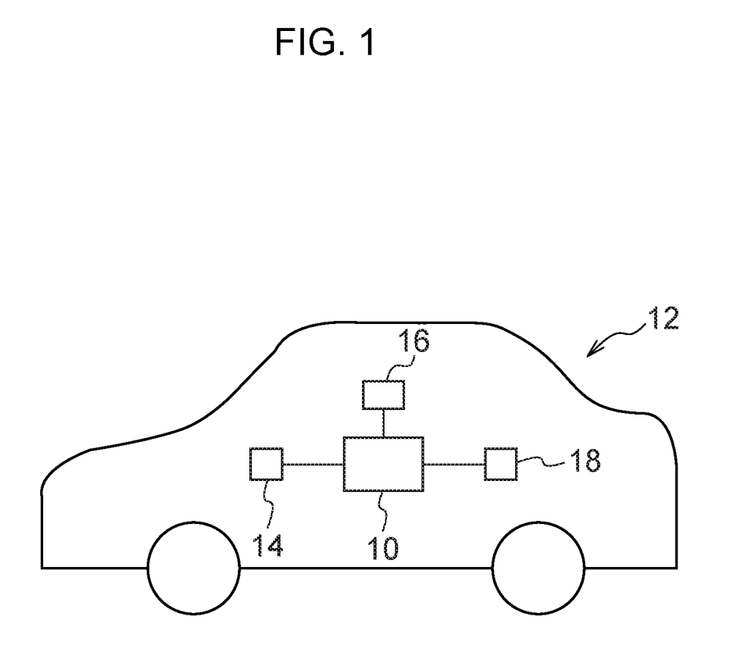
FIG. 1 is a schematic diagram of a vehicle installed with an onboard information processing device according to an exemplary embodiment.

FIG. 1 illustrates a vehicle 12 installed with the onboard information processing device 10 of the present exemplary embodiment. The onboard information processing device 10 is an electronic control unit (ECU). Thus, in the following explanation the onboard information processing device 10 will be referred to as the ECU 10. The vehicle 12 includes the ECU 10, and plural other ECUs (not illustrated in the drawings) that are separate to the ECU 10. The ECU 10 and the plural other ECUs conform to AUTOSAR specifications. The ECU 10 and the plural other ECUs are connected to each other through a bus (not illustrated in the drawings). A network including the ECU 10, the plural other ECUs, and the bus is for example configured by a CAN, Ethernet (registered trademark), or FlexRay (registered trademark) network. The ECU 10 and the plural other ECUs are capable of exchanging various information through the bus.

Figure 2:
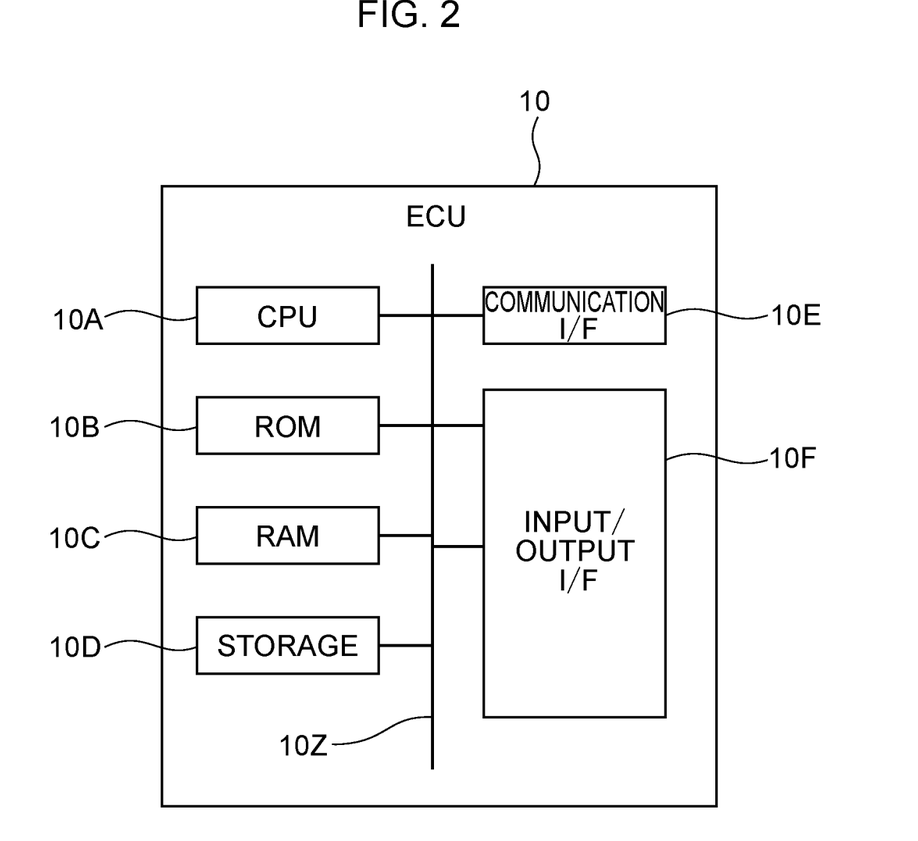
FIG. 2 is a control block diagram for the onboard information processing device illustrated in FIG. 1.

As illustrated in FIG. 2, the ECU 10 and the plural other ECUs are each configured including a central processing unit (CPU; processor) 10A, read only memory (ROM) 10B serving as a non-transitory recording medium (storage medium), random access memory (RAM) 10C serving as a non-transitory recording medium (storage medium), storage 10D serving as a non-transitory recording medium (storage medium), a communication interface (I/F) 10E, and an input/output I/F 10F. The CPU 10A, the ROM 10B, the RAM 10C, the storage 10D, the communication I/F 10E, and the input/output I/F 10F are connected so as to be capable of communicating with each other through a bus 10Z. The ECU 10 and the plural other ECUs are capable of acquiring time-related information from a timer (not illustrated in the drawings).

The CPU 10A is a central processing unit that executes various programs and controls various sections. Namely, the CPU 10A reads various programs, described later, from the ROM 10B or the storage 10D, and executes the programs using the RAM 10C as a workspace. The CPU 10A controls respective configurations and performs various arithmetic processing according to the programs recorded in the ROM 10B or the storage 10D.

The ROM 10B hold various programs and various data. The RAM 10C serves as a workspace to temporarily store programs or data. The storage 10D is configured by a storage device such as a hard disk drive (HDD) or a solid state drive (SSD), and holds various programs and various data. The communication I/F 10E is an interface that allows the ECU 10 (or other ECU) to communicate with other equipment. The communication I/F 10E is connected to the bus. The input/output I/F 10F is an interface for communicating with respective devices installed to the vehicle 12. For example, a wheel speed sensor 14, a steering torque sensor 16, and a cooling water temperature sensor 18, described later, are connected to the input/output I/F 10F of the ECU 10.

Figure 3:
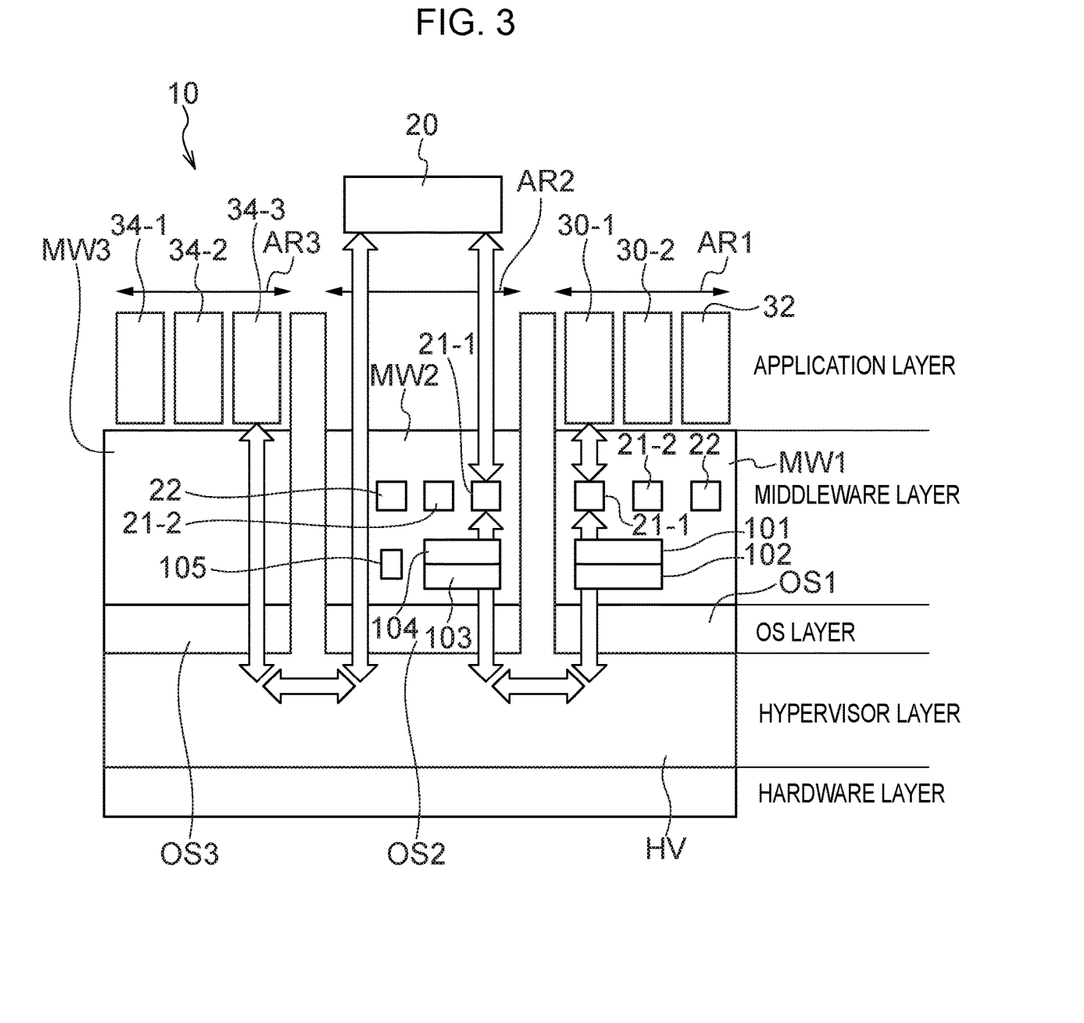
FIG. 3 is a schematic diagram illustrating layers of the onboard information processing device illustrated in FIG. 2.

As illustrated in FIG. 3, the ECU 10 includes a hardware layer, a hypervisor layer, an OS layer, a middleware layer, and an application layer. A hypervisor HV, a first operating system OS1, a second operating system OS2, a third operating system OS3, a first middleware MW1, a second middleware MW2, a third middleware MW3, non-genuine applications 30 (hereafter referred to as non-genuine APPs 30), a genuine application 32 (hereafter referred to as a genuine APP 32), and genuine applications 34 (hereafter referred to as genuine APPs 34) are installed in the ROM 10B as the above-mentioned programs. Note that the non-genuine APPs 30 collectively refer to two non-genuine APPs 30-1, 30-2. The genuine APPs 34 collectively refer to three genuine APPs 34-1, 34-2, 34-3. The genuine APP 32 and the genuine APPs 34 are programs developed by the vehicle maker that manufactured the vehicle 12. The non-genuine APPs 30 are programs developed by a third party.

The ECU 10 functions as virtual machines through the hypervisor HV. The ECU 10 is partitioned into three virtual regions. Namely, the ECU 10 is partitioned into a non-trusted region AR1, a public data management region AR2, and a control region AR3. The first operating system OS1 that operates on the hypervisor HV, the first middleware MW1 that operates on the first operating system OS1, and the non-genuine APPs 30 and the genuine APP 32 that operate on the first middleware MW1 are installed in the non-trusted region AR1. The second operating system OS2 that operates on the hypervisor HV independently of the first operating system OS1, and the second middleware MW2 that operates on the second operating system OS2 are installed in the public data management region AR2. The third operating system OS3 that operates on the hypervisor HV independently of the first operating system OS1 and the second operating system OS2, the third middleware MW3 that operates on the third operating system OS3, and the genuine APPs 34 that operate on the third middleware MW3 are installed in the control region AR3.

The ECU 10 is connected to the sensors 14, 16, 18 that each detect a physical quantity that changes in correlation with at least one of travel, steering, or braking of the vehicle 12. In the present exemplary embodiment, the sensor 14 is a wheel speed sensor 14 that is capable of detecting wheel speed, the sensor 16 is a steering torque sensor 16 that is capable of detecting steering torque of a steering wheel, and the sensor 18 is a cooling water temperature sensor 18 that is capable of detecting the temperature of engine cooling water. However, the sensors 14, 16, 18 may be configured so as to detect physical quantities other than these physical quantities (such as a steering angle of the steering wheel, a yaw rate of the vehicle 12, or pressing force on a brake pedal).

In the present exemplary embodiment, the genuine APP 34-1 executes predetermined control using data relating to the wheel speed acquired by the wheel speed sensor 14. The genuine APP 34-2 executes predetermined control using data relating to the steering torque acquired by the steering torque sensor 16. The genuine APP 34-3 executes predetermined control using data relating to the cooling water temperature acquired by the cooling water temperature sensor 18.

The wheel speed-related data, the steering torque-related data, and the cooling water temperature-related data acquired by the genuine APPs 34 are recorded in a public data recording section 20, configured by the ROM 10B or the storage 10D, through the third middleware MW3, the third operating system OS3, the hypervisor HV, the second operating system OS2, and the second middleware MW2.

The first middleware MW1 and the second middleware MW2 each include programs for implementing two public application programmable interfaces (APIs) 21-1, 21-2, and one native API 22. The public API 21-1 and the public API 21-2 are hereafter sometimes collectively referred to as the public APIs 21. The public API 21-1 of the first middleware MW1 and the public API 21-1 of the second middleware MW2 are formed on a virtual communication path implemented by the hypervisor HV. The public API 21-2 of the first middleware MW1 and the public API 21-2 of the second middleware MW2 are also formed on a virtual communication path. The native API 22 of the first middleware MW1 and the native API 22 of the second middleware MW2 are also formed on a virtual communication path.

Figure 4:
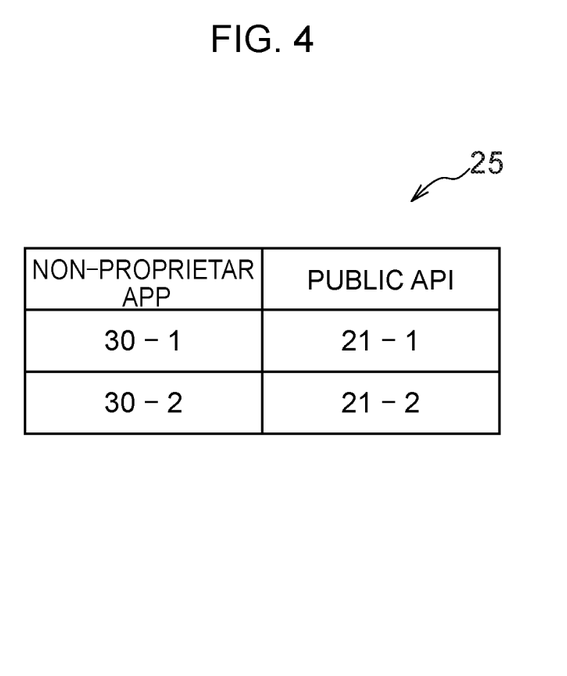
FIG. 4 is a diagram illustrating a correspondence relationship list recorded in the onboard information processing device illustrated in FIG. 2.

The respective non-genuine APPs 30 are capable of accessing the public APIs 21 of the first middleware MW1 and the second middleware MW2. As illustrated in FIG. 4, a correspondence relationship list 25 illustrates correspondence relationships between the respective non-genuine APPs 30 and the public APIs 21 that the respective non-genuine APPs 30 are capable of accessing. In other words, the correspondence relationship list 25 specifies correspondence relationships between the respective non-genuine APPs 30 and permitted data, described later. The correspondence relationship list 25 is recorded in both a recording section (such as the ROM 10B) of the non-trusted region AR1, and in a recording section (such as the ROM 10B) of the public data management region AR2. The non-genuine APP 30-1 is capable of accessing the public APIs 21-1, and the non-genuine APP 30-2 is capable of accessing the public APIs 21-2. By accessing the public APIs 21-1, the non-genuine APP 30-1 is capable of reading and writing to the wheel speed-related data recorded in the public data recording section 20 and associated with the public APIs 21-1. By accessing the public APIs 21-2, the non-genuine APP 30-2 is capable of reading and writing the steering torque-related data recorded in the public data recording section 20 and associated with the public APIs 21-2. The correspondence relationship list 25 is created based on a contract between the third parties that developed the non-genuine APPs 30 and the vehicle maker. Note that the genuine APP 32 is capable of accessing the native APIs 22. By accessing the native APIs 22, the genuine APP 32 is capable of reading and writing the cooling water temperature-related data recorded in the public data recording section 20 and associated with the native APIs 22. The non-genuine APPs 30 and the genuine APP 32 execute various control using the acquired data.

Figure 5:
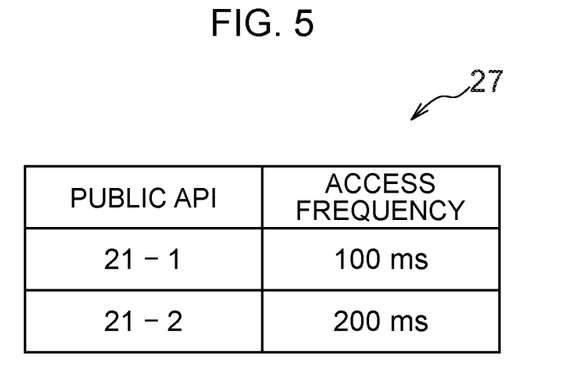
FIG. 5 is a diagram illustrating a frequency list recorded in the onboard information processing device illustrated in FIG. 2.

A frequency list 27 such as that illustrated in FIG. 5 is also recorded in the ROM 10B. The frequency list 27 specifies frequency conditions expressing relationships between the respective public APIs 21 and access frequencies set for the respective public APIs 21. In cases in which the access frequency with which a non-genuine APP 30 accesses a public API 21 does not exceed the frequency specified by the frequency list 27, this accessing of the public API 21 by the non-genuine APP 30 is considered to be legitimate access. However, in cases in which a non-genuine APP 30 accesses a public API 21 at a frequency exceeding the frequency specified by the frequency list 27, this accessing of the public API 21 by the non-genuine APP 30 is considered to be illegitimate access. In the present exemplary embodiment, the frequency list 27 stipulates an access frequency for the public API 21-1 as 100 milliseconds (ms), and stipulates an access frequency for the public API 21-2 as 200 milliseconds (ms).

Figure 6:
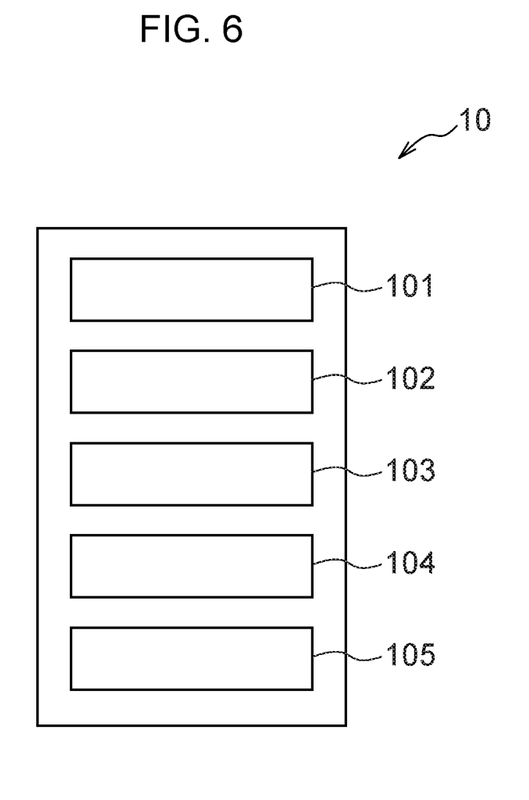
FIG. 6 is a functional block diagram for the onboard information processing device illustrated in FIG. 2.

FIG. 6 is a block diagram illustrating an example of functional configuration of the ECU 10. The ECU 10 includes a first determination section 101, a first access control section 102, a second determination section 103, a second access control section 104, and an anomaly processing section 105 as functional configuration. The first determination section 101, the first access control section 102, the second determination section 103, the second access control section 104, and the anomaly processing section 105 are implemented by the CPU 10A reading and executing the hypervisor HV, the first operating system OS1, the second operating system OS2, the first middleware MW1, and the second middleware MW2 all of which are stored in the ROM 10B.

The first determination section 101 is a function that is implemented by the first middleware MW1. The first determination section 101 determines whether or not an API accessed by a non-genuine APP 30 is a public API 21. In cases in which the first determination section 101 determines that a non-genuine APP 30 has accessed a public API 21, the first determination section 101 determines based on the correspondence relationship list 25 whether or not the accessed public API 21 is a public API 21 that the non-genuine APP 30 is permitted to access. The API accessed by a non-genuine APP 30 is also referred to hereafter as the "target API". In cases in which the target API is an API which the non-genuine APP 30 is permitted to access, the target API is also referred to as a "permitted API".

The first access control section 102 is a function that is implemented by the first middleware MW1. In cases in which the first determination section 101 has determined that the target API 21 is a permitted API 21, the first access control section 102 permits the non-genuine APP 30 that has accessed the permitted API 21 to access the second middleware MW2 through a virtual communication path through the first operating system OS1, the hypervisor HV, and the second operating system OS2.

The second determination section 103 is a function that is implemented by the second middleware MW2. The second determination section 103 determines whether or not the access frequency of the permitted API 21 by the non-genuine APP 30 that the first determination section 101 has determined to have accessed a permitted API 21, exceeds the frequency specified by the frequency list 27.

The second determination section 103 also performs the same processing as the first determination section 101 based on the correspondence relationship list 25. Namely, the second determination section 103 determines whether or not the target API 21 is a permitted API 21 based on the correspondence relationship list 25.

The second access control section 104 is a function that is implemented by the second middleware MW2. In cases in which the second determination section 103 has determined that the target API 21 is a permitted API 21, the second access control section 104 permits the non-genuine APP 30 that has accessed the permitted API 21 to access permitted data, this being data that is recorded in the public data recording section 20 and is associated with the permitted API 21.

The anomaly processing section 105 is a function that is implemented by the second middleware MW2. As described later, the anomaly processing section 105 performs processing with respect to a non-genuine APP 30 that has accessed a public API 21 when necessary based on the manner in which the non-genuine APP 30 has accessed the public API 21.

Figure 7:
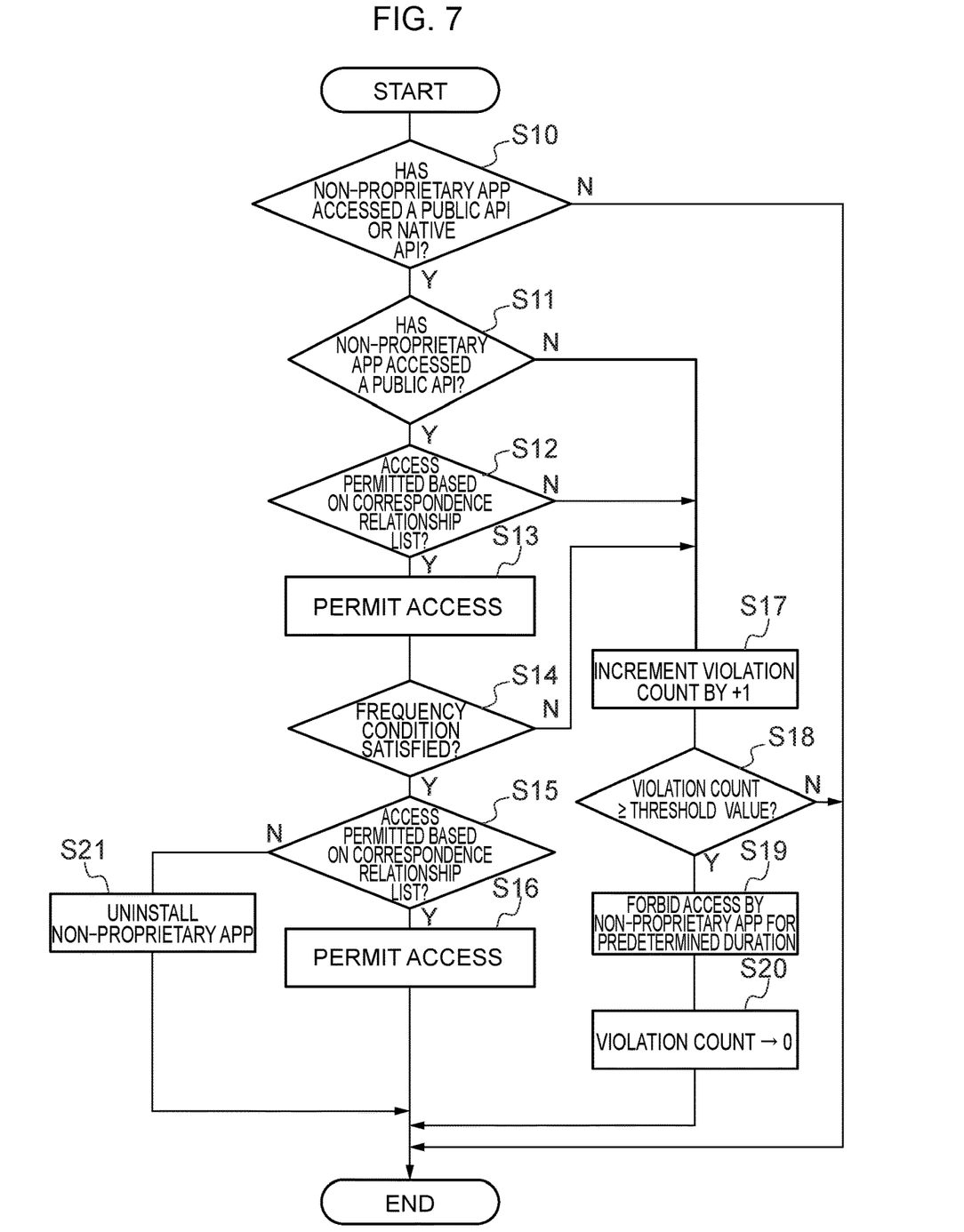
FIG. 7 is a flowchart illustrating processing performed by the onboard information processing device illustrated in FIG. 2.

Next, explanation follows regarding a flow of processing performed by the ECU 10, with reference to the flowchart in FIG. 7. The ECU 10 executes the processing of the flowchart repeatedly each time a predetermined duration elapses.

At step S10, the first determination section 101 of the ECU 10 determines whether or not any of the non-genuine APPs 30 has accessed a public API 21 or a native API 22.

In cases in which a determination of Yes has been made at step S10, the ECU 10 proceeds to step S11. At step S11, the first determination section 101 determines whether or not the non-genuine APP 30 has accessed a public API 21.

In cases in which a determination of Yes has been made at step S11, the ECU 10 proceeds to step S12. At step S12, the first determination section 101 determines whether or not the public API 21 that this non-genuine APP 30 has accessed is a permitted API based on the correspondence relationship list 25. In other words, the first determination section 101 determines whether or not target data, namely the data that the non-genuine APP 30 is attempting to access, is permitted data. For example, in a case in which the non-genuine APP 30 is the non-genuine APP 30-1, the first determination section 101 determines whether or not the non-genuine APP 30-1 has accessed the public API 21-1.

In cases in which a determination of Yes has been made at step S12, the ECU 10 proceeds to step S13. At step S13, the first access control section 102 permits the non-genuine APP 30 that has accessed the permitted API 21 to access the second middleware MW2 through the first operating system OS1, the hypervisor HV, and the second operating system OS2.

After completing the processing of step S13, the ECU 10 proceeds to step S14, the second determination section 103 determines whether or not the access frequency of the permitted API 21 by the non-genuine APP 30 is the frequency specified by the frequency list 27 or lower. In a case in which the non-genuine APP 30-1 has accessed the public API 21-1, the second determination section 103 determines whether or not the non-genuine APP 30-1 has made repeated access to the public API 21-1 at an interval of less than 100 ms. In cases in which the access frequency by the non-genuine APP 30 does not exceed the frequency specified by the frequency list 27, the second determination section 103 makes a determination of Yes at step S14, and the ECU 10 proceeds to step S15.

On proceeding to step S15, the second determination section 103 determines whether or not the public API 21 accessed by the non-genuine APP 30 is a permitted API based on the correspondence relationship list 25.

In cases in which a determination of Yes has been made at step S15, the ECU 10 proceeds to step S16. At step S16, the second access control section 104 permits the non-genuine APP 30 that has accessed the permitted API 21 to access the permitted data recorded in the public data recording section 20. This enables the non-genuine APP 30 to acquire the permitted data. This non-genuine APP 30 that has accessed the permitted data is also capable of overwriting the permitted data.

In cases in which the ECU 10 makes a determination of No at either step S11, S12, or S14, the ECU 10 proceeds to step S17.

On proceeding to step S17, the anomaly processing section 105 of the ECU 10 increments a violation count by "1". Note that an initial value of the violation count is "0".

After completing the processing of step S17, the ECU 10 proceeds to step S18, the anomaly processing section 105 determines whether or not a total value of the violation count is a threshold value or above. This threshold value is a natural number of two or greater. The threshold value is recorded in the ROM 10B or the storage 10D.

In cases in which a determination of Yes has been made at step S18, the ECU 10 proceeds to step S19. On proceeding to step S19, the anomaly processing section 105 forbids the non-genuine APP 30 for which a determination of Yes was made at step S18 from accessing the public API 21 for a predetermined duration. The anomaly processing section 105 determines whether or not this predetermined duration has elapsed based on information acquired from the timer mentioned previously.

After completing the processing of step S19, the ECU 10 proceeds to step S20, the anomaly processing section 105 sets the total value of the violation count to "0".

In cases in which the second determination section 103 makes a determination of No at step S15, the ECU 10 proceeds to step S21. On proceeding to step S21, the anomaly processing section 105 uninstalls the non-genuine APP 30 for which the determination of No was made at step S15 from the ECU 10.

After completing the processing of step S16, S20, or S21, or in cases in which a determination of NO has been made at step S10 or S18, the ECU 10 ends the current round of processing of the flowchart.

Operation and Advantageous Effects

Next, explanation follows regarding operation and advantageous effects of the present exemplary embodiment.

The correspondence relationship list 25 of the ECU 10 of the present exemplary embodiment specifies rules expressing correspondence relationships between the respective non-genuine APPs 30 and the permitted APIs 21 that each of the non-genuine APPs 30 is permitted to access. Based on the correspondence relationship list 25, the first determination section 101 implemented by the first middleware MW1 monitors activity by the non-genuine APPs 30 attempting to access the data recorded in the public data recording section 20. The rules specified by the correspondence relationship list 25 are simpler than rules that define all the processes (behaviors) of each of the non-genuine APPs 30. The ECU 10 of the present exemplary embodiment is thus able to monitor, based on simple rules, activity by the non-genuine APPs 30 to access the respective data recorded in the public data recording section 20. Thus, the computational load on the ECU 10 does not become too large. There is accordingly no need to construct the ECU 10 using an expensive hardware configuration.

Furthermore in the ECU 10, based on the correspondence relationship list 25, the second determination section 103 implemented by the second middleware MW2 monitors activity to access the data recorded in the public data recording section 20 by a non-genuine APP 30 that the first determination section 101 has determined to have accessed a permitted API. In this manner, access to the public data recording section 20 by the non-genuine APP 30 is monitored at two stages, with the result that determination as to whether or not the target API 21 accessed by this non-genuine APP 30 is a permitted API 21 is performed with high accuracy.

Furthermore, in the ECU 10, the first determination section 101 monitors activity by the non-genuine APPs 30 to access the data recorded in the public data recording section 20. The computational load on the public data management region AR2 of the ECU 10 therefore tends not to become as high as it would in a case in which the ECU 10 was not provided with the first determination section 101 and the first access control section 102.

Furthermore, the frequency list 27 specifies frequency conditions expressing relationships between the respective public APIs 21 and access frequencies set for the respective public APIs 21. In cases in which the second determination section 103 determines that the frequency of access of a permitted API 21 by a non-genuine APP 30 does not satisfy the corresponding frequency condition, the second access control section 104 does not permit this non-genuine APP 30 to access the permitted data. The rules relating to the frequency conditions set out by the frequency list 27 are simpler than rules defining all the processes of each of the non-genuine APPs 30. The ECU 10 is thus able to monitor, based on simple rules, activity by the non-genuine APPs 30 to access the respective data recorded in the public data recording section 20.

Furthermore, a non-genuine APP 30 that the second determination section 103 has determined to have accessed a public API 21 that is not a permitted API at step S15 is an application that should have been forbidden by the first determination section 101 from accessing the first operating system OS1, the hypervisor HV, the second operating system OS2, and the second middleware MW2. Despite this, the non-genuine APP 30 has cleared a check by the first determination section 101 in an attempt to access the first operating system OS1, the hypervisor HV, the second operating system OS2, and the second middleware MW2. Such accessing of the public API 21 by this non-genuine APP 30 thus is considered to be very high risk illegitimate access. The anomaly processing section 105 therefore uninstalls this non-genuine APP 30 from the ECU 10. This enables the ECU 10 to be protected from non-genuine APPs 30 with the potential to carry out a high risk attack on the ECU 10.

Illegitimate access activity by a non-genuine APP 30 in cases in which a determination of No is made by the first determination section 101 at step S11 or S12, or illegitimate access activity by a non-genuine APP 30 in cases in which a determination of No is made by the second determination section 103 at step S14, pose less of a threat than illegitimate access activity by a non-genuine APP 30 in cases in which a determination of No is made at step S15. Thus, in the present exemplary embodiment the non-genuine APP 30 is not uninstalled from the ECU 10 in such cases. Namely, a non-genuine APP 30 that has executed such illegitimate access activity repeatedly so as to meet the threshold value or above is forbidden from accessing the public API 21 for a predetermined duration by the anomaly processing section 105.

Furthermore, data relating to a physical quantity that changes in correlation with at least one of travel, steering, or braking of the vehicle 12 that has been acquired by the genuine APPs 34 is recorded in the public data recording section 20. The present exemplary embodiment is capable of preventing non-genuine APPs 30 from illegitimately accessing this data. There is accordingly a low risk of a non-genuine APP 30 illegitimately acquiring this data and executing control based on this data.

Although explanation has been given above regarding the ECU 10 according to the present exemplary embodiment, the ECU 10 may undergo design modifications as appropriate within a range not departing from the spirit of the present disclosure.

The ECU 10 may be configured without the second determination section 103 and the second access control section 104. In such cases, the first access control section 102 allows a non-genuine application 30 that the first determination section 101 has determined to have accessed a permitted API to access the permitted data.

The ECU 10 may be configured without the first determination section 101 and the first access control section 102. In such cases, the second access control section 104 allows a non-genuine application 30 that the second determination section 103 has determined to have accessed a permitted API to access the permitted data.

The anomaly processing section 105 may be configured so as to execute just one out of the processing of step S17 to S20 or the processing of step S21.

Configuration may be such that all of the applications installed in the non-trusted region AR1 are applications developed by the vehicle maker, and that all the APIs in the non-trusted region AR1 and the public data management region AR2 are native APIs. Alternatively, configuration may be such that all of the applications installed in the non-trusted region AR1 are applications developed by third parties, and that all the APIs in the non-trusted region AR1 and the public data management region AR2 are public APIs.

The anomaly processing section 105 may be configured so as to monitor an operational status of at least one of the first operating system OS1 or the first middleware MW1 based on a system log acquired by at least one of the first operating system OS1 or the first middleware MW1. Moreover, in cases in which the anomaly processing section 105 determines based on the operational status that at least one of the first operating system OS1 or the first middleware MW1 is executing an illegitimate process, the anomaly processing section 105 may temporarily halt all activity in the non-trusted region AR1.

For example, in cases in which a new non-genuine APP 30 has been downloaded to the ECU 10 through the internet, the correspondence relationship list 25 may be updated such that information relating to a correspondence relationship between this non-genuine APP 30 and the public APIs 21 (permitted APIs) is recorded therein.

Any number of applications may be installed in the non-trusted region AR1, and any number of applications may be installed in the control region AR3. Moreover, any number of APIs may be present in the non-trusted region AR1 and the public data management region AR2 respectively.

Types of data other than data relating to a physical quantity that changes in correlation with at least one of travel, steering, or braking of the vehicle may be recorded in the public data recording section 20.

What is claimed is:

1. An onboard information processing device, comprising:
    a processor configured to read and execute a hypervisor, a first operating system and a second operating system that operate independently of each other on the hypervisor, and at least one of first applications that operate on the first operating system;
    a first recording section at which a plurality of types of data are recorded, the plurality of types of data being accessible by the first applications via the hypervisor and the second operating system; and
    a second recording section at which a correspondence relationship list is recorded, the correspondence relationship list specifying correspondence relationships between each of the first applications and permitted data, the permitted data being data the respective first applications have been permitted to access, wherein:
    the processor is configured to determine, based on the correspondence relationship list, whether or not target data, which is data that the at least one first application is attempting to access, is the permitted data,
    the processor is configured to permit the at least one first application to access the target data in a case in which the target data is determined to be the permitted data, and is configured not to permit the at least one first application to access the target data in a case in which the target data is determined not to be the permitted data,
    a first middleware that operates on the first operating system implements at least one application programmable interface (API),
    each of the first applications operates on the first middleware,
    the correspondence relationship list specifies correspondence relationships between each of the first applications and a permitted API configuring the API that the respective first application is permitted to access, to enable the respective first application to acquire the permitted data,
    in a case in which the processor has determined, by executing the first middleware, that one of the first applications has accessed a target API configuring at least one of the APIs, the processor determines whether or not the target API is the permitted API based on the correspondence relationship list,
    in a case in which the processor has determined that the first application has accessed the permitted API, the processor permits the first application to access the second operating system via the first operating system and the hypervisor by executing the first middleware,
    a second middleware that operates on the second operating system implements at least one API,
    the processor executes the second middleware to determine, based on the correspondence relationship list, whether or not the target API accessed by the first application, previously determined by the processor to have accessed the permitted API, is the permitted API, and
    in a case in which the processor has determined, by executing the second middleware, that the target API is the permitted API, the processor permits the first application to access the permitted data.

2. The onboard information processing device of claim 1, further comprising:
    a third recording section at which is recorded a frequency list specifying a frequency condition that is a condition relating to frequency of access to the permitted API by the first application, wherein:
    in a case in which the processor has determined that an access frequency to the permitted API by the first application does not satisfy the frequency condition, the processor does not permit the first application to access the permitted data.

3. The onboard information processing device of claim 1, wherein the processor uninstalls, from the onboard information processing device, the first application that accessed the target API in a case in which the processor has determined, by executing the second middleware, that the target API is not the permitted API.

4. The onboard information processing device of claim 1, wherein the data recorded at the first recording section is data acquired by at least one second application that operates on a third operating system operating on the hypervisor independently of the first operating system and the second operating system.

5. The onboard information processing device of claim 4, wherein the at least one second application is configured to acquire data relating to a physical quantity that changes in correlation with at least one of travel, steering, or braking of a vehicle installed with the onboard information processing device.

6. An information processing method, in which a processor configured to read and execute a hypervisor, a first operating system and a second operating system that operate independently of each other on the hypervisor, and at least one of first applications that operate on the first operating system, is configured to:

determine, in a case in which one of the first applications has attempted to access a recording section, at which is recorded a plurality of types of data, via the hypervisor and the second operating system, whether or not target data, the target data being data that the first application is attempting to access, is permitted data based on a correspondence relationship list specifying correspondence relationships between each of the first applications and the permitted data, the permitted data being data that the respective first applications have been permitted to access;

permit the first application to access the target data in a case in which the target data is determined to be the permitted data, and not permit the first application to access the target data in a case in which the target data is determined not to be the permitted data;

implementing at least one application programmable interface (API) via a first middleware that operates on the first operating system and each of the first applications operates on the first middleware;

specifying correspondence relationships with the correspondence relationship list between each of the first applications and a permitted API configuring the API that the respective first application is permitted to access, to enable the respective first application to acquire the permitted data;

in a case in which the processor has determined, by executing the first middleware, that one of the first applications has accessed a target API configuring at least one of the APIs, determining whether or not the target API is the permitted API based on the correspondence relationship list;

in a case in which the processor has determined that the first application has accessed the permitted API, permitting the first application to access the second operating system via the first operating system and the hypervisor by executing the first middleware implementing at least one API via a second middleware that operates on the second operating system;

executing the second middleware to determine, based on the correspondence relationship list, whether or not the target API accessed by the first application, previously determined to have accessed the permitted API, is the permitted API; and in a case in which the processor has determined, by executing the second middleware, that the target API is the permitted API, permitting the first application to access the permitted data.

7. A non-transitory recording medium storing a program executable by a computer to perform processing, the program including:

a hypervisor;

a first operating system and a second operating system that operate independently of each other on the hypervisor; and at least one of first applications that operate on the first operating system and that are configured to access a plurality of types of data via the hypervisor and the second operating system, and the processing comprising:

determining whether or not target data, the target data being data that one of the first applications is attempting to access, is permitted data based on a correspondence relationship list specifying correspondence relationships between each of the first applications and the permitted data, the permitted data being data that the respective first applications are permitted to access;

permitting the first application to access the target data in a case in which the target data is determined to be the permitted data, and not to permit the first application to access the target data in a case in which the target data is determined not to be the permitted data;

implementing at least one application programmable interface (API) via a first middleware that operates on the first operating system and each of the first applications operates on the first middleware;

specifying correspondence relationships with the correspondence relationship list between each of the first applications and a permitted API configuring the API that the respective first application is permitted to access, to enable the respective first application to acquire the permitted data;

in a case in which the processing determined, by executing the first middleware, that one of the first applications has accessed a target API configuring at least one of the APIs, determining whether or not the target API is the permitted API based on the correspondence relationship list;

in a case in which the processing determined that the first application has accessed the permitted API, permitting the first application to access the second operating system via the first operating system and the hypervisor by executing the first middleware implementing at least one API via a second middleware that operates on the second operating system;

executing the second middleware to determine, based on the correspondence relationship list, whether or not the target API accessed by the first application, previously determined to have accessed the permitted API, is the permitted API; and in a case in which the processing determined, by executing the second middleware, that the target API is the permitted API, permitting the first application to access the permitted data.

* * * * *